United States Patent
Nemoto et al.

(10) Patent No.: US 8,673,044 B2
(45) Date of Patent: Mar. 18, 2014

(54) PROCESS FOR PRODUCING ALUMINUM TITANATE-BASED CERAMICS BODY

(75) Inventors: Akiyoshi Nemoto, Tsukuba (JP); Hajime Yoshino, Niihama (JP); Masayuki Narumi, Niihama (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days.

(21) Appl. No.: 13/262,134

(22) PCT Filed: Mar. 29, 2010

(86) PCT No.: PCT/JP2010/055601
§ 371 (c)(1), (2), (4) Date: Dec. 20, 2011

(87) PCT Pub. No.: WO2010/113893
PCT Pub. Date: Oct. 7, 2010

(65) Prior Publication Data
US 2012/0073255 A1    Mar. 29, 2012

(30) Foreign Application Priority Data
Mar. 30, 2009 (JP) ................................ 2009-082820

(51) Int. Cl.
- B01D 39/14 (2006.01)
- B01D 39/06 (2006.01)
- B01D 24/00 (2006.01)
- B01D 50/00 (2006.01)
- F01N 3/00 (2006.01)

(52) U.S. Cl.
USPC ............... 55/523; 55/522; 55/524; 422/169; 422/170; 422/171; 422/172; 422/177; 422/178; 422/179; 422/180; 422/181; 422/182; 60/297

(58) Field of Classification Search
USPC ............... 55/522–524; 60/297; 422/169–172, 422/177–182
See application file for complete search history.

(56) References Cited

U.S. PATENT DOCUMENTS

| | | | |
|---|---|---|---|
| 4,327,188 A | 4/1982 | Endo et al. | |
| 6,849,181 B2* | 2/2005 | Ogunwumi et al. | 210/510.1 |
| 7,651,755 B2* | 1/2010 | Yoshida | 428/116 |
| 7,901,480 B2* | 3/2011 | Zuberi et al. | 55/523 |
| 7,959,704 B2* | 6/2011 | Liu et al. | 55/523 |
| 2005/0050845 A1* | 3/2005 | Masukawa et al. | 52/782.1 |
| 2005/0069675 A1 | 3/2005 | Noguchi | |
| 2006/0021309 A1* | 2/2006 | Merkel | 55/523 |
| 2006/0175250 A1* | 8/2006 | Shimodaira | 210/510.1 |
| 2006/0221550 A1 | 10/2006 | Ryu et al. | |
| 2006/0254231 A1* | 11/2006 | Hayashi et al. | 55/523 |
| 2007/0039297 A1* | 2/2007 | Kawata et al. | 55/523 |
| 2007/0163219 A1* | 7/2007 | Fukuda et al. | 55/523 |
| 2007/0224110 A1 | 9/2007 | Fukuda et al. | |
| 2007/0298958 A1 | 12/2007 | Harada et al. | |
| 2008/0124504 A1* | 5/2008 | Faber et al. | 428/34.4 |
| 2008/0125305 A1* | 5/2008 | Day et al. | 501/80 |
| 2009/0057939 A1* | 3/2009 | Henry et al. | 264/43 |
| 2009/0092786 A1* | 4/2009 | Liu et al. | 428/116 |
| 2009/0103238 A1 | 4/2009 | Ryu et al. | |
| 2009/0113863 A1* | 5/2009 | Lu et al. | 55/523 |
| 2009/0202779 A1* | 8/2009 | Yoshida | 428/116 |
| 2009/0220734 A1* | 9/2009 | Backhaus-Ricoult et al. | 428/116 |
| 2010/0044911 A1 | 2/2010 | Suwabe et al. | |
| 2010/0237007 A1* | 9/2010 | Merkel et al. | 210/510.1 |
| 2010/0298114 A1 | 11/2010 | Maki et al. | |
| 2011/0236688 A1 | 9/2011 | Suzuki et al. | |

FOREIGN PATENT DOCUMENTS

| | | |
|---|---|---|
| CN | 1946653 A | 4/2007 |
| EP | 2241536 A1 | 10/2010 |
| EP | 2336087 A1 | 6/2011 |
| JP | 10-218662 A | 8/1998 |
| JP | 11-228219 A | 8/1999 |
| JP | 2005-126317 A | 5/2005 |
| JP | 2005-170763 A | 6/2005 |
| JP | 2006-273708 A | 10/2006 |
| WO | 2005/105704 A1 | 11/2005 |
| WO | 2008/066765 A1 | 6/2008 |
| WO | 2008/078747 A1 | 7/2008 |

OTHER PUBLICATIONS

Extended European Search Report and Written Opinion issued Oct. 25, 2012 in European Patent Application No. 10758664.6 to Sumitomo Chemical Co., Ltd.
Chinese Office Action issued on Jan. 14, 2013 by the Chinese Patent Office in Chinese Patent Application No. 201080015326.1.

* cited by examiner

*Primary Examiner* — Amber Orlando
(74) *Attorney, Agent, or Firm* — Sughrue Mion, PLLC

(57) ABSTRACT

The invention is to provide a process for producing an aluminum titanate-based ceramics body, wherein, as a regenerated starting material, a fired body recovered in a production process for an aluminum titanate-based ceramics body is used and the aluminum titanate-based ceramics body excellent in a mechanical strength and in a thermal characteristics such as low thermal expansion and heat resistance can be obtained. The invention provides a process for producing an aluminum titanate-based ceramics body using a fired ceramics body recovered in a production process for an aluminum titanate-based ceramics body, comprising the following steps: a step of preparing a pulverized product having a median particle diameter of 100 μm or less from the fired ceramics body; a step of preparing a regenerated clay containing the pulverized product and water; a step of shaping the regenerated clay to form a shaped body; and a step of firing the shaped body.

19 Claims, No Drawings

PROCESS FOR PRODUCING ALUMINUM TITANATE-BASED CERAMICS BODY

CROSS REFERENCE TO RELATED APPLICATIONS

This application is a National Stage of International Application No. PCT/JP2010/055601 filed on Mar. 29, 2010, which claims priority from Japanese Patent Application No. 2009-082820, filed on Mar. 30, 2009, the contents of all of which are incorporated herein by reference in their entirety.

TECHNICAL FIELD

The present invention relates to a process for producing an aluminum titanate-based ceramics body, and more precisely to a process for producing an aluminum titanate-based ceramics body which uses the fired ceramics body recovered in a production process of an aluminum titanate-based ceramics body as a regenerated starting material.

BACKGROUND ART

Aluminum titanate-based ceramics are ceramics containing titanium and aluminum as the constitutive elements and showing a crystal pattern of aluminum titanate in X-ray diffractometry, and are known as ceramics excellent in heat resistance. Aluminum titanate-based ceramics have heretofore been used for firing tools such as crucibles. Recently, the industrial applicability of the ceramics is increasing as a material of constituting a ceramics filter (diesel particulate filter, hereinafter referred to as DPF) for collecting fine carbon particles (diesel particulates) contained in exhaust gas discharged from internal combustion engines such as diesel engines.

As a process for producing aluminum titanate-based ceramics, known is a method of firing a starting material mixture containing a powder of a titanium source compound such as titania and a powder of an aluminum source compound such as alumina, or a shaped body thereof (Patent Reference 1).

CITATION LIST

Patent Reference

Patent Reference 1: WO05/105704

SUMMARY OF THE INVENTION

Problems that the Invention is to Solve

When an aluminum titanate-based ceramics shaped body having a desired shape is intended to be obtained by a process of firing a starting material mixture or a shaped body thereof as disclosed in Patent Reference 1, there may occur some failures such as chipping or cracking of the shaped body during or after shaping of the fired body, or during or after firing the shaped body of starting material mixture.

Recycling the above-mentioned failed products is favorable from the viewpoint of increase for yield ratio and cost reduction, however, aluminum titanate-based ceramics body obtained by recycling such failed products have been unsatisfactory in point of the mechanical strength and of the thermal characteristics such as low thermal expansion and heat resistance.

Accordingly, an object of the invention is to provide a process for producing an aluminum titanate-based ceramics body, wherein, as a regenerated starting material, the fired body such as the above-mentioned failed products recovered in a production process for an aluminum titanate-based ceramics body is used and the aluminum titanate-based ceramics body excellent in a mechanical strength and in a thermal characteristics such as low thermal expansion and heat resistance can be obtained.

Means for Solving the Problems

The invention provides a process for producing an aluminum titanate-based ceramics body using a fired ceramics body recovered in a production process for an aluminum titanate-based ceramics body, comprising the following steps:

(i) a step of preparing a pulverized product having a median particle diameter of 100 μm or less from the fired ceramics body;

(ii) a step of preparing a regenerated clay containing the pulverized product and water;

(iii) a step of shaping the regenerated clay to form a shaped body; and (iv) a step of firing the shaped body.

The fired ceramics body preferably contains an aluminum titanate-based crystal structure. The fired ceramics body may further contain a magnesium element and/or a silicon element other than an aluminum element and a titanium element.

The step (i) of preparing a pulverized product having a median particle diameter of 100 μM or less preferably includes a step of pulverizing and classifying the fired ceramics body. The classification can be carried out, for example, by sieving.

The median particle diameter of the pulverized product is preferably from 10 to 50 μm. The particle diameter distribution of the pulverized product measured through laser diffractometry preferably satisfies the following formula (1):

$$D90/D10 \leq 8 \tag{1}$$

wherein D90 is a particle diameter corresponding to a cumulative percentage of 90% on a volume basis, and D10 is a particle diameter corresponding to a cumulative percentage of 10% on a volume basis.

The regenerated clay may further contain one or more ingredients selected from a group of a binder, a lubricant and a pore-forming agent.

The regenerated clay may further contain a new starting material comprising an aluminum titanate-based ceramics powder and/or a ceramics powder mixture to be led to an aluminum titanate-based ceramics by firing.

The aluminum titanate-based ceramics powder to constitute the new starting material may further contain a magnesium element and/or a silicon element other than an aluminum element and a titanium element.

The ceramics powder mixture to constitute the new starting material preferably contains an aluminum source powder and a titanium source powder, and may further contain a magnesium source powder and/or a silicon source powder. As the silicon source powder, a powder comprising feldspar or glass frit, or a mixture thereof can favorably used.

The median particle diameter of the aluminum titanate-based ceramics powder and/or the ceramics powder mixture, which constitute the new starting material, is preferably 100 μm or less.

The firing temperature in the step (iv) of firing the shaped body is preferably not lower than 1300° C. and lower than 1650° C.

The invention include an aluminum titanate-based ceramics honeycomb shaped body for porous ceramics filters, produced in the process according to any of the above-mentioned process, and further include a diesel particulate filter comprising the honeycomb shaped body.

Advantage of the Invention

By the production process of the invention, with using a regenerated starting material, there can be provided an aluminum titanate-based ceramics body excellent in a mechanical strength and in a thermal characteristics such as low thermal expansion and heat resistance, and the yield ratio of the aluminum titanate-based ceramics body can be thereby greatly increased. The aluminum titanate-based ceramics body obtained by the invention is favorably applicable for ceramics filters such as DPF.

Mode for Carrying Out the Invention

In the production process for an aluminum titanate-based ceramics body of the invention, the fired ceramics body generated and recovered in a production process for aluminum titanate-based ceramics body is used as at least a part of a starting material, and the process comprises the following steps:

(i) A step of preparing a pulverized material having a median particle diameter of 100 μm or less from the fired ceramics body;

(ii) A step of preparing a regenerated clay containing the pulverized material and water;

(iii) A step of shaping the regenerated clay to form a shaped body; and (iv) A step of firing the shaped body.

Each step is described in detail hereinunder.

(i) Pulverizing Step:

In this step, a pulverized material having a median particle diameter of 100 μm or less is obtained from a fired ceramics body. Using the recovered ceramics body of which the particle diameter is suitably controlled as a regenerated starting material makes it possible to produce an aluminum titanate-based ceramics body excellent in a mechanical strength and in a thermal characteristics such as low thermal expansion and heat resistance. The fired ceramics body means a fired product of ceramics that is generated and recovered in a production process for an aluminum titanate-based ceramics body (hereinafter the production process for fired ceramics body which is the target for recovering is referred to as "production process for recovery" for the purpose of differentiating it from the production process of the invention), and its form may be any of a powdery form, a massive form or a shaped body. The "production process for recovery" is not specifically limited so far as the process includes a firing step for producing an aluminum titanate-based ceramics body. For example, as the starting material in the "production process for recovery", there may be included (i) a ceramics powder mixture to be led to an aluminum titanate-based ceramics by firing (for example, a mixture containing an aluminum source powder, a titanium source powder, and optionally added magnesium source powder and silicon source powder), or (ii) an aluminum titanate-based ceramics powder, or (iii) both of these. As the "production process for recovery", there can be included a production process including a firing step of the starting material or a shaped body thereof. The production process may include a step of adjusting the obtained shaped body to make it have a desired shape.

As the aluminum source powder, the titanium source powder, the magnesium source powder and the silicon source powder to be used as the starting material in the "production process for recovery", usable are the same materials as the aluminum source powder, the titanium source powder, the magnesium source powder and the silicon source powder to be contained in the "ceramic powder mixture to be led to an aluminum titanate-based ceramics by firing as a new starting material" to be mentioned below. As the aluminum titanate-based ceramics powder to be used as the starting material in the "production process for recovery", usable is the same one as the aluminum titanate-based ceramics powder to be used as a new starting material.

The fired ceramics body that is generated and recovered in the above-mentioned "production process for recovery" is not specifically limited so far as the ceramics body goes through at least a part of a firing step. Its specific example can include a failed shaped body which goes through at least a part of a firing step, for example, a failed shaped body generated during or after firing the above-mentioned starting material shaped body (for example, a shaped body in which cracking, chipping and the like is generated, or a broken piece thereof); a broken piece or a ceramic powder generated during adjusting a fired shaped bodies to have a desired shape (for example, cutting powders and the like that are generated during cutting a fired shaped body).

The fired ceramics body to be used as the regenerated starting material contains an aluminum element and a titanium element. When a mixture containing a magnesium source powder and/or a silicon source powder, or an aluminum titanate-based ceramics powder containing a magnesium element and/or a silicon element is used as the starting material in the "production process for recovery" along with the aluminum source powder and the titanium source powder therein, the fired ceramics body may further contain a magnesium element and/or a silicon element. When a ceramics body containing a magnesium element and/or a silicon element is used as the regenerated starting material, an aluminum titanate-based ceramics body having more improved heat resistance can be obtained.

The fired ceramics body to be used as the regenerated starting material is one which goes through at least a part of a firing step in a production process for an aluminum titanate-based ceramics body, and therefore, in general, the body contains an aluminum titanate-based crystal structure. Preferably, the fired ceramics body to be used as the regenerated starting material comprises mainly an aluminum titanate-based crystal, more preferably completely or almost completely an aluminum titanate-based crystal, from the viewpoint of preventing the composition change of the regenerated starting material before and after the grinding or before and after the classification by grinding and classification.

The method of obtaining a pulverized material having a median particle diameter of 100 μm or less from the fired ceramics body is not specifically limited, for which there can be mentioned a method of pulverizing the fired ceramics body with a known grinding apparatus, optionally followed by classifying the pulverized material. As the grinding apparatus, a jaw crusher, a roller mill, a pin mill and the like can be used. Pulverizing with grinding media is also favorable. The classification method is not specifically limited, for which, for example, preferred is sieving with a sieve or a mesh, dry classification based on the difference in the inertial force or the centrifugal force given to air current-entrained powder, wet classification based on the difference in the precipitation speed of powder dispersed in liquid, and combination of such multiple classification methods. When the fired ceramics body is powdery, pulverizing is not always necessary in obtaining the pulverized material having a median particle diameter of 100 μm or less, and classification may also be unnecessary.

The pulverizing (optionally followed by classification) may be carried out plural times. For example, a fired ceramics body is pulverized and classified to give a pulverized material having a median particle diameter of 100 μm or less, and then the residue may be again pulverized and classified to recover a pulverized material having a median particle diameter of 100 μm or less from the resulting residue. The recycling rate of the fired ceramics body can be thereby increased.

In the invention, the median particle diameter of the pulverized material means a particle diameter (D50) corresponding to a cumulative percentage of 50% on a volume basis measured through laser diffractometry. Preferably, the median particle diameter of the pulverized material is from 10 to 50 μm, more preferably from 20 to 40 μm, from the viewpoint of enhancing the mechanical strength and/or the low thermal expansion property and the heat resistance of the aluminum titanate-based ceramics body to be obtained.

For making the aluminum titanate-based ceramics body obtained by the production process of the invention have uniform physical properties (for example, mechanical strength and thermal characteristics), the particle diameter distribution of the pulverized material to be the starting material is preferably sharp, and the particle diameter distribution of the pulverized material measured through laser diffractometry preferably satisfies the following formula (1):

$$D90/D10 \leq 8 \tag{1}$$

In the formula, D90 means a particle diameter corresponding to a cumulative percentage of 90% on a volume basis, and D10 means a particle diameter corresponding to a cumulative percentage of 10% on a volume basis. D90/D10 of the pulverized material is more preferably 5 or less.

(ii) Regenerated Clay Preparation Step:

In this step, a regenerated clay which contains the pulverized material having a median particle diameter of 100 μm or less obtained in the above step (i) and water is prepared. The regenerated clay can be obtained by kneading the pulverized material with adding water thereto. For the kneading, an ordinary kneader can be used. As described below, the regenerated clay is fired after being shaped, then an aluminum titanate-based ceramics body whose starting material is the above-mentioned fired ceramics can be obtained.

To the regenerated clay, a new starting material may be further added as a part of the starting material of the aluminum titanate-based ceramics body, along with the pulverized material of the fired ceramics body that is recovered in the "production process for recovery", and the new starting material may be (i) an aluminum titanate-based ceramics powder, or (ii) a ceramic powder mixture to be led to an aluminum titanate-based ceramics by firing, or (iii) both of these. The new starting material means a newly-added starting material that is not one generated and recovered in the "production process for recovery".

The aluminum titanate-based ceramics powder as the new starting material is a ceramics powder mainly comprising an aluminum titanate-based crystal, and contains at least an aluminum element and a titanium element as the constitutive elements. The aluminum titanate-based ceramics powder may further contain a magnesium element and/or a silicon element. When the aluminum titanate-based ceramics powder containing a magnesium element and/or a silicon element is used, an aluminum titanate-based ceramics body having more improved heat resistance can be obtained. The aluminum titanate-based ceramics powder may contain inevitable impurities that are derived from the starting materials thereof or are mixed in the production process.

The X-ray diffraction spectrum of the aluminum titanate-based ceramics powder as the new starting material may include crystal patterns of alumina, titania, silica and the like other than the crystal pattern of aluminum titanate or aluminum magnesium titanate. When the aluminum titanate-based ceramic powder comprises an aluminum magnesium titanate crystal, the ceramic can be represented by a compositional formula, $Al_{2(1-x)}Mg_xTi_{(1+x)}O_5$. In the compositional formula, the value x is preferably 0.01 or more, more preferably not less than 0.01 and not more than 0.7, even more preferably not less than 0.02 and not more than 0.5.

For the ceramics powder mixture to be led to an aluminum titanate-based ceramics by firing as the new starting material, there can be mentioned a mixture containing an aluminum source powder and a titanium source powder.

The aluminum source powder is a powder of a compound that will become the aluminum ingredient to constitute the aluminum titanate-based ceramics body. The aluminum source powder includes, for example, a powder of alumina (aluminum oxide). The alumina may be crystalline or amorphous. When the alumina is crystalline, the crystal form thereof includes a γ form, a δ form, a θ form, and an α form. Above all, an α-form alumina is preferably used.

The aluminum source powder may also be a powder of a material to be led to alumina by firing in air. The material includes, for example, aluminum salt, aluminum alkoxide, aluminum hydroxide, and aluminum metal.

The aluminum salt may be a salt with an inorganic acid, or a salt with an organic acid. The inorganic salt particularly includes, for example, nitrates such as aluminum nitrate, ammonium aluminum nitrate; and carbonates such as ammonium aluminum carbonate. The organic salt includes, for example, aluminum oxalate, aluminum acetate, aluminum stearate, aluminum lactate, and aluminum laurate.

Particularly, the aluminum alkoxide includes, for example, aluminum isopropoxide, aluminum ethoxide, aluminum sec-butoxide, and aluminum tert-butoxide.

The aluminum hydroxide may be crystalline or amorphous. When the aluminum hydroxide is crystalline, the crystal form thereof includes, for example, a gibbsite form, a bayerite form, a norstrandite form, a boehmite form, and a pseudo-boehmite form. Amorphous aluminum hydroxide includes, for example, an aluminum hydrolyzate to be obtained by hydrolysis of an aqueous solution of a water-soluble aluminum compound such as aluminum salt, aluminum alkoxide.

As the aluminum source powder, one type alone may be used or two or more types may be used in combination with each other. Of the above, as the aluminum source powder, an alumina powder is preferred, and an α-form alumina powder is more preferred. The aluminum source powder may contain inevitable impurities that are derived from the starting materials thereof or are mixed in the production process.

The titanium source powder to be contained in the ceramics powder mixture as the new starting material is a powder of a material that will become the titanium ingredient to constitute the aluminum titanate-based ceramics body. The material is, for example, a powder of titanium oxide. Titanium oxide includes, for example, titanium(IV) oxide, titanium(III) oxide, and titanium(II) oxide. Titanium(IV) oxide is preferably used. The titanium(IV) oxide may be crystalline or amorphous. When the titanium(IV) oxide is crystalline, the crystal form thereof includes an anatase form, a rutile form, and a brookite form. An anatase-form or rutile-form titanium(IV) oxide is more preferred.

The titanium source powder may also be a powder of a material to be led to titania (titanium oxide) by firing in air. The material includes, for example, titanium salt, titanium alkoxide, titanium hydroxide, titanium nitride, titanium sulfide, and titanium metal.

The titanium salt particularly includes titanium trichloride, titanium tetrachloride, titanium(IV) sulfide, titanium(VI) sulfide, and titanium(IV) sulfate. The titanium alkoxide particularly includes titanium(IV) ethoxide, titanium(IV) methoxide, titanium(IV) t-butoxide, titanium(IV) isobutoxide, titanium(IV) n-propoxide, titanium(IV) tetraisopropoxide, and their chelate compounds.

As the titanium source powder, one type alone may be used or two or more types may be used in combination with each other. Of the above, a titanium oxide powder is preferred as the titanium source powder, and a titanium (IV) oxide powder is more preferred. The titanium source powder may contain inevitable impurities that are derived from the starting materials thereof or are mixed in the production process.

The ratio by mass of the $Al_2O_3$ (alumina)-equivalent amount of the aluminum source powder to the $TiO_2$ (titania)-equivalent amount of the titanium source powder in the mixture containing the aluminum source powder and the titanium source powder may be, for example, from 30/70 to 70/30, preferably from 40/60 to 60/40, though depending on the composition of the pulverized material of the regenerated starting material, on the composition of the aluminum titanate-based ceramics powder concurrently usable as the new starting material, and on the content ratio of the ceramics powder mixture that is concurrently usable as the new starting material and is led to an aluminum titanate-based ceramics by firing.

In the invention, an $Al_2O_3$(alumina)-equivalent mass $x_1$ of the aluminum source powder can be calculated by the following formula (A).

$$x_1 = N_{10} \times x_{10} \tag{A}$$

In the formula (A), $N_{10}$ represents the formula weight of $Al_2O_3$, $x_{10}$ represents an $Al_2O_3$(alumina)-equivalent molar amount of the aluminum source powder. An $Al_2O_3$(alumina)-equivalent molar amount $x_{10}$ of the aluminum source powder can be calculated by the following formula (A-1).

$$x_{10} = (w_1 \times M_1)/(N_1 \times 2) \tag{A-1}$$

In the formula (A-1), $w_1$ represents an amount (g) of the aluminum source powder to be used; $M_1$ represents the molar amount of aluminum in 1 mol of the aluminum source powder; $N_1$ represents the formula weight of the aluminum source powder to be used. In the invention, when two or more types of aluminum source powders are used, the $Al_2O_3$(alumina)-equivalent molar amount of each aluminum source powder is calculated by the formula (A-1), and each molar amount are summed up to give the $Al_2O_3$(alumina)-equivalent molar amount of the aluminum source powders to be used.

In the invention, a $TiO_2$(titania)-equivalent mass $x_2$ of the titanium source powder can be calculated by the following formula (B).

$$X_2 = N_{20} \times x_{20} \tag{B}$$

In the formula (B), $N_{20}$ represents the formula weight of $TiO_2$, $x_{20}$ represents a $TiO_2$(titania)-equivalent molar amount of the titanium source powder. A $TiO_2$(titania)-equivalent molar amount $x_{20}$ of the titanium source powder can be calculated by the following formula (B-1).

$$X_{20} = (w_2 \times M_2)/N_2 \tag{B-1}$$

In the formula (B-1), $w_2$ represents an amount (g) of the titanium source powder to be used; $M_2$ represents the molar amount of titanium in 1 mol of the titanium source powder; $N_2$ represents the formula weight of the titanium source powder to be used. In the invention, when two or more types of titanium source powders are used, the $TiO_2$(titania)-equivalent molar amount of each titanium source powder is calculated by the formula (B-1), and each molar amount are summed up to give the $TiO_2$(titania)-equivalent molar amount of the titanium source powders to be used.

The mixture containing the aluminum source powder and the titanium source powder may contain a magnesium source powder. The magnesium source powder includes a powder of magnesia (magnesium oxide) and a powder of a material to be led to magnesia by firing in air. Examples of the latter include, for example, magnesium salt, magnesium alkoxide, magnesium hydroxide, magnesium nitride, and magnesium metal.

The magnesium salt particularly includes magnesium chloride, magnesium perchlorate, magnesium phosphate, magnesium pyrophosphate, magnesium oxalate, magnesium nitrate, magnesium carbonate, magnesium acetate, magnesium sulfate, magnesium citrate, magnesium lactate, magnesium stearate, magnesium salicylate, magnesium myristate, magnesium gluconate, magnesium dimethacrylate, and magnesium benzoate.

The magnesium alkoxide particularly includes magnesium methoxide, and magnesium ethoxide.

As the magnesium source powder, a powder of a material serving both as a magnesium source and an aluminum source can be used. The material includes, for example, magnesia spinel ($MgAl_2O_4$).

As the magnesium source powder, one type alone may be used or two or more types may be used in combination with each other. The magnesium source powder may contain inevitable impurities that are derived from the starting materials thereof or are mixed in the production process.

The MgO (magnesia)-equivalent content of the magnesium source powder in the mixture containing the aluminum source powder and the titanium source powder is generally from 0.1 to 10 parts by mass, and preferably 8 parts by mass or less relative to 100 parts by mass of the total of the $Al_2O_3$ (alumina)-equivalent amount of the aluminum source powder and the $TiO_2$ (titania)-equivalent amount of the titanium source powder, though depending on the composition of the pulverized material of the regenerated starting material, on the composition of the aluminum titanate-based ceramics powder concurrently usable as the new starting material, and on the content ratio of the ceramics powder mixture led to an aluminum titanate-based ceramics by firing as the new starting material.

In the invention, a MgO(magnesia)-equivalent mass $x_3$ of the magnesium source powder can be calculated by the following formula (C).

$$X_3 = N_{30} \times x_{30} \tag{C}$$

In the formula (C), $N_{30}$ represents the formula weight of MgO, $x_{30}$ represents a MgO(magnesia)-equivalent molar amount of the magnesium source powder. A MgO(magnesia)-equivalent molar amount $x_{30}$ of the magnesium source powder can be calculated by the following formula (C-1).

$$X_{30} = (w_3 \times M_3)/N_3 \tag{C-1}$$

In the formula (C-1), $w_3$ represents an amount (g) of the magnesium source powder to be used; $M_3$ represents the molar amount of magnesium in 1 mol of the magnesium source powder; $N_3$ represents the formula weight of the magnesium source powder to be used. In the invention, when two or more types of magnesium source powders are used, the MgO(magnesia)-equivalent molar amount of each magnesium source powder is calculated by the formula (C-1), and each molar amount are summed up to give the MgO(magnesia)-equivalent molar amount of the magnesium source powders to be used.

The mixture containing the aluminum source powder and the titanium source powder may further contain a silicon source powder. The silicon source powder is a powder of a material to be contained in the aluminum titanate-based ceramics body as a silicon ingredient. The silicon source powder includes, for example, a powder of silicon oxide (silica) such as silicon dioxide, and silicon monoxide.

The silicon source powder may also be a powder of a material capable of being led to silica by firing in air. The material includes, for example, silicic acid, silicon carbide, silicon nitride, silicon sulfide, silicon tetrachloride, silicon acetate, sodium silicate, sodium orthosilicate, feldspar, and glass frit. Of those, feldspar, glass frit and the like are preferably use, and glass frit and the like are more preferably used from the viewpoint of easiness for industrial availability and stable composition. Glass frit is flaky or powdery glass to be obtained by grinding glass. As the silicon source powder, use of a powder comprising a mixture of feldspar and glass frit is also preferred.

When glass frit is used, from the viewpoint of more improving the thermal decomposition resistance of the aluminum titanate-based ceramics body to be obtained, use of one having a deformation point of 700° C. or higher is preferred. In the invention, the deformation point of glass frit is defined as the temperature (° C.) which is measured with a thermo-mechanical analyzer (TMA), and at which expansion stops and then shrinkage starts next in a process of measuring the expansion of glass frit by heating it from a low temperature.

As the glass to constitute the above-mentioned glass frit, an ordinary silicate glass that comprises silicic acid [$SiO_2$] as the main ingredient thereof (contained in an amount of more than 50% by mass of all the constitutive ingredients) can be used. As the other constitutive ingredients than silicic acid, the glass to constitute the glass frit may contain alumina [$Al_2O_3$], sodium oxide [$Na_2O$], potassium oxide [$K_2O$], calcium oxide [$CaO$], magnesia [$MgO$] and the like, like an ordinary silicate glass. The glass to constitute the glass frit may contain $ZrO_2$ for improving the hot water resistance of the glass itself.

As the silicon source powder, one type alone may be used or two or more types may be used in combination with each other. The silicon source powder may contain inevitable impurities that are derived from the starting materials thereof or are mixed in the production process.

The $SiO_2$ (silica)-equivalent content of the silicon source powder in the mixture containing the aluminum source powder and the titanium source powder is generally from 0.1 to 10 parts by mass, and preferably 8 parts by mass or less relative to 100 parts by mass of the total of the $Al_2O_3$ (alumina)-equivalent amount of the aluminum source powder and the $TiO_2$ (titania)-equivalent amount of the titanium source powder, though depending on the composition of the pulverized material of the regenerated starting material, on the composition of the aluminum titanate-based ceramics powder concurrently usable as the new starting material, and on the content ratio of the ceramics powder mixture led to an aluminum titanate-based ceramics by firing as the new starting material.

In the invention, a $SiO_2$(silica)-equivalent mass $x_4$ of the silicon source powder can be calculated by the following formula (D).

$$X_4 = N_{40} \times x_{40} \quad (D)$$

In the formula (D), $N_{40}$ represents the formula weight of $SiO_2$, $x_{40}$ represents a $SiO_2$ (silica)-equivalent molar amount of the silicon source powder. A $SiO_2$ (silica)-equivalent molar amount $x_{40}$ of the silicon source powder can be calculated by the following formula (D-1).

$$X_{40} = (w_4 \times M_4)/N_4 \quad (D-1)$$

In the formula (D-1), $w_4$ represents an amount (g) of the silicon source powder to be used; $M_4$ represents the molar amount of silicon in 1 mol of the silicon source powder; $N_4$ represents the formula weight of the silicon source powder to be used. In the invention, when two or more types of silicon source powders are used, the $SiO_2$(silica)-equivalent molar amount of each silicon source powder is calculated by the formula (D-1), and each molar amount are summed up to give the $SiO_2$(silica)-equivalent molar amount of the titanium source powders to be used.

The mixture containing the aluminum source powder, the titanium source powder, and optionally added the magnesium source powder and/or the silicon source powder may include a compound that contains two or more metal elements of titanium, aluminum, silicon and magnesium, like the above-mentioned composite oxide of magnesia spinel ($MgAl_2O_4$) and the like. In this case, such a compound can be considered to be equivalent to the mixture prepared by mixing the individual metal source compounds.

The median particle diameter (D50) of the aluminum titanate-based ceramics powder to be added as a new starting material to the regenerated clay, and the ceramics powder contained in the ceramics powder mixture to be led to an aluminum titanate-based ceramics by firing (aluminum source powder, titanium source powder, magnesium source powder, silicon source powder and the like) is preferably 100 μm or less, more preferably from 1 to 50 μm from the viewpoint of further improving the mechanical strength and/or the low thermal expansion property and the heat resistance of the aluminum titanate-based ceramics body to be obtained.

The content ratio of the pulverized material in the regenerated clay, the aluminum titanate-based ceramics powder and the ceramics powder mixture to be led to an aluminum titanate-based ceramics by firing is not specifically limited, and is preferably controlled in consideration of the composition of the pulverized material to be the regenerated starting material, the composition of the aluminum titanate-based ceramics powder concurrently usable as the new starting material, and the composition of the ceramics powders in the ceramics powder mixture as the new starting material to be led to an aluminum titanate-based ceramics by firing. Particularly, the content ratio is preferably so controlled that the ratio by mass of the $Al_2O_3$ (alumina)-equivalent amount of the Al ingredient to the $TiO_2$ (titania)-equivalent amount of the Ti ingredient in the regenerated clay could be from 30/70 to 70/30, more preferably from 40/60 to 60/40. Also preferably, the MgO (magnesia)-equivalent content of the Mg diesel particulate filter ingredient in the regenerated clay is controlled to be from 0.1 to 10 parts by mass, more preferably 8 parts by mass or less relative to 100 parts by mass of the total of the $Al_2O_3$ (alumina)-equivalent amount of the Al ingredient and the $TiO_2$ (titania)-equivalent amount of the Ti ingredient. Additionally, the $SiO_2$ (silica)-equivalent content of the Si ingredient in the regenerated clay is preferably controlled to be from 0.1 to 10 parts by mass, more preferably 8 parts by mass or less relative to 100 parts by mass of the total of the $Al_2O_3$ (alumina)-equivalent amount of the Al ingredient and the $TiO_2$ (titania)-equivalent amount of the Ti ingredient. By controlling the content ratio of the Al ingredient, the Ti ingredient, the Mg ingredient and the Si ingredient to fall within the range, it is easy to obtain an aluminum titanate-based ceramics body more excellent in mechanical strength and thermal characteristics such as low thermal expansion and heat resistance.

The regenerated clay may further contain, if desired, any one or more ingredients selected from a group of binder, lubricant and pore-forming agent. The binder includes celluloses such as methyl cellulose, carboxymethyl cellulose, sodium carboxymethyl cellulose; alcohols such as polyvinyl alcohol; salts such as lignin sulfonate; waxes such as paraffin wax, microcrystalline wax; and thermoplastic resins such as EVA, polyethylene, polystyrene, liquid-crystal polymer, engineering plastics. The amount of the binder to be added is generally 20 parts by mass or less, preferably 15 parts by mass or less relative to 100 parts by mass of the total of the $Al_2O_3$ (alumina)-equivalent amount of the Al ingredient, the $TiO_2$ (titania)-equivalent amount of the Ti ingredient, the MgO (magnesia)-equivalent amount of the Mg ingredient and the $SiO_2$ (silica)-equivalent amount of the Si ingredient in the regenerated clay.

The lubricant includes alcohols such as glycerin; higher fatty acids such a caprylic acid, lauric acid, palmitic acid, alginic acid, oleic acid, stearic acid; and metal salts of stearic acid such as aluminum stearate. The amount of the lubricant to be added is generally from 0 to 10 parts by mass, preferably from 1 to 5 parts by mass relative to 100 parts by mass of the total of the $Al_2O_3$ (alumina)-equivalent amount of the Al ingredient, the $TiO_2$ (titania)-equivalent amount of the Ti ingredient, the MgO (magnesia)-equivalent amount of the Mg ingredient and the $SiO_2$ (silica)-equivalent amount of the Si ingredient in the regenerated clay.

The pore-forming agent includes carbon materials such as graphite; resins such as polyethylene, polypropylene, polymethyl methacrylate; vegetable materials such as starch, nutshell, walnut-shell, corn; ice; and dry ice. The amount of the pore-forming agent to be added is generally from 0 to 40 parts by mass, preferably from 0 to 25 parts by mass relative to 100 parts by mass of the total of the $Al_2O_3$ (alumina)-equivalent amount of the Al ingredient, the $TiO_2$ (titania)-equivalent amount of the Ti ingredient, the MgO (magnesia)-equivalent amount of the Mg ingredient and the $SiO_2$ (silica)-equivalent amount of the Si ingredient in the regenerated clay.

A dispersant of, for example, inorganic acids such as nitric acid, hydrochloric acid, sulfuric acid; organic acids such as oxalic acid, citric acid, acetic acid, malic acid, lactic acid; alcohols such as methanol, ethanol, propanol; and surfactants such as ammonium polycarboxylate, polyoxyalkylene alkyl ether may be added to the regenerated clay. The amount of the dispersant to be added is generally from 0 to 20 parts by mass, preferably from 2 to 8 parts by mass relative to 100 parts by mass of the total of the $Al_2O_3$ (alumina)-equivalent amount of the Al ingredient, the $TiO_2$ (titania)-equivalent amount of the Ti ingredient, the MgO (magnesia)-equivalent amount of the Mg ingredient and the $SiO_2$ (silica)-equivalent amount of the Si ingredient in the regenerated clay.

(iii) Shaping Step:

In this step, the above-mentioned regenerated clay is shaped to give a shaped body. The shape of the shaped body is not specifically limited, and includes, for example, a honeycomb shape, a rod shape, a tubular shape, a tabular shape, and a crucible-like shape. Above all, when the obtained aluminum titanate-based ceramics body is applied to ceramics filters such as DPF, a honeycomb shape is preferred. The shaping machine usable for shaping the regenerated clay includes a uniaxial press, an extrusion shaping machine, a tabletting machine, and a granulating machine.

(iv) Firing Step:

In this step, the above-mentioned, regenerated clay shaped body is fired to give an aluminum titanate-based ceramics body. The firing temperature in firing the shaped body is generally 1300° C. or higher, preferably 1400° C. or higher. The firing temperature is generally lower than 1650° C., preferably 1550° C. or lower. The heating rate up to the firing temperature is not specifically defined, and generally from 1° C./hr to 500° C./hr. When the regenerated clay contains a silicon ingredient derived from the silicon element, which is contained in the silicon source powder of the new starting material or in the pulverized material and/or the aluminum titanate-based ceramics powder of the new starting material, preferably, a step of maintaining in a temperature range of from 1100 to 1300° C. for at least 3 hours is provided prior to the firing step. This can promote fusion and diffusion of the silicon ingredient in the aluminum titanate-based ceramics body.

The firing step generally includes a step of drying the regenerated clay shaped body and a degreasing step (when the regenerated clay contains a combustible organic material such as binder). Typically, the drying and degreasing step is carried out during the heating stage up to the firing temperature (for example, in a temperature range not higher than 500° C.).

In general, the firing is carried out in air, but if desired, the firing may be carried out in an inert gas such as nitrogen gas or argon gas, or in a reducing gas such as carbon monoxide gas or hydrogen gas. The firing may also be carried out in an atmosphere having a lowered water vapor partial pressure.

In general, the firing is carried out using an ordinary firing furnace such as a tubular electric furnace, a boxy electric furnace, a tunnel furnace, a far-IR furnace, a microwave heating furnace, a shaft furnace, a reverberating furnace, a rotary furnace, or a roller hearth furnace. The firing may be carried out by batch process, or may be carried out by continuous process. The firing may be carried out in a static mode or may be carried out in a fluidized mode.

The time to be taken for the firing may vary depending on the amount of the starting material mixture, the type of the firing furnace, the firing temperature, the firing atmosphere and the like, and in general, the time is from 1 minute to 300 hours, preferably from 10 minutes to 24 hours.

As described above, the intended aluminum titanate-based ceramics body can be obtained. The aluminum titanate-based ceramics body keeps approximately the same shape as that of the shaped body immediately after shaping. The obtained, aluminum titanate-based ceramics body can be processed into a desired form by cutting, machining and the like.

The X-ray diffraction spectrum of the aluminum titanate-based ceramics body obtained by the invention may include crystal patterns of alumina, titania, silica and the like other than the crystal pattern of aluminum titanate or aluminum magnesium titanate. When the aluminum titanate-based ceramics powder comprises an aluminum magnesium titanate crystal, the ceramic powder may be represented by a compositional formula, $Al_{2(1-x)}Mg_xTi_{(1+x)}O_5$. In the compositional formula, the value x is preferably 0.01 or more, more preferably not less than 0.01 and not more than 0.7, even more preferably not less than 0.02 and not more than 0.5.

The fired ceramics body that has been generated and recovered in the production step according to the production process of the invention may be further used as the regenerated starting material in the production process of the invention.

EXAMPLES

The invention is described in more detail with reference to the following Examples, but the invention should not be limited to these. The three-point bending strength, the aluminum titanate conversion ratio (AT conversion ratio), the coefficient of thermal expansion, the opening porosity and the pore diameter of the obtained aluminum titanate-based ceramic body, and the particle diameter distribution of the starting material (including pulverized material) to be used were measured according to the following methods.

(1) Three-Point Bending Strength:

A rectangular piece having a length of 50 mm, a width of 5 mm and a thickness of 5 mm was cut out of the aluminum titanate-based ceramics body, in the extrusion direction in extrusion shaping thereof. The outer surface of the thus-cut ceramics body was polished to be smooth with no visible roughness, using a sandpaper (#1500). The three-point bending strength of the obtained sample was measured by the method according to JIS R 1601.

(2) AT Conversion Ratio:

The aluminum titanate conversion ratio (AT conversion ratio) was calculated from the integrated intensity ($I_T$) of the peak [assigned to the titania-rutile phase (110) face] appearing at the position of $2\theta=27.4°$ in the powdery X-ray diffraction spectrum of the aluminum titanate-based ceramics body pulverized in a mortar, and the integrated intensity ($I_{AT}$) of the peak [assigned to the aluminum magnesium titanate phase (230) face] appearing at the position of $2\theta=33.7°$ therein by the following formula.

AT Conversion Ratio=$I_{AT}/(I_T+I_{AT})\times 100(\%)$.

(3) Coefficient of Thermal Expansion:

A rectangular piece having a length of 50 mm, a width of 5 mm and a thickness of 5 mm was cut out of the aluminum titanate-based ceramics body, in the extrusion direction in extrusion shaping, and then this was accurately cut so as to have parallel cut faces each having a length of 12 mm. Next, the test piece was heated up to 1000° C. at a heating rate of 200° C./hr to burn away the fixation resin used in the cutting operation, and then cooled to room temperature (25° C.). Using a thermomechanical analyzer (SII Technology's TMA6300), the heat-treated test piece was heated from room temperature (25° C.) up to 1000° C. at 600° C./hr, and from the expansion rate of the test piece, the coefficient [$K^{-1}$] of thermal expansion was calculated based on the following formula:

Coefficient [$K^{-1}$] of Thermal Expansion=expansion rate of the test piece/975 [K].

In this, the expansion rate of the test piece means: (length of the test piece in the extrusion direction when heated up to 1000° C.–length of the test piece in the extrusion direction before heating (25° C.))/(length of the test piece in the extrusion direction before heating (25° C.)).

(4) Opening Porosity

By an Archimedes method by dipping in water according to JIS R1634, the weight in water M2 (g), the water-saturated weight M3 (g) and the dry weight M1 (g) of the aluminum titanate-based ceramics body were measured, and the opening porosity was calculated by the following formula:

Opening Porosity (%)=$100\times(M3-M1)/(M3-M2)$.

(5) Pore Diameter:

The aluminum titanate-based ceramics body in an amount of 0.4 g was pulverized, and the obtained small piece of about 2 mm square was dried in air at 120° C. for 4 hours, and then analyzed to measure the pore radius in a detection range of from 0.001 to 100.0 μm by a mercury intrusion method. The value obtained by doubling the pore radius showing the maximum frequency on a pore volume basis is taken as the pore diameter (mode diameter). As the measurement apparatus, Micrometrics' "Autopore III9420" was used.

(6) Particle Diameter Distribution of Starting Material Powder:

The median particle diameter [particle diameter (D50) corresponding to a cumulative percentage of 50% on a volume basis] of the starting material powder, and the particle diameter (D10) corresponding to a cumulative percentage of 10% on a volume basis and the particle diameter (D90) corresponding to a cumulative percentage of 90% were determined using a laser diffractiometric particle sizer (Nikkiso's Microtrac HRA (X-100)".

Comparative Example 1

As the starting material powders, the following were used. The prepared composition of the following starting material powders is, in terms of the alumina [$Al_2O_3$]-equivalent, titania [$TiO_2$]-equivalent, magnesia [MgO]-equivalent and silica [$SiO_2$]-equivalent ratio by mass, [$Al_2O_3$]/[$TiO_2$]/[MgO]/[$SiO_2$]=47%/47%/2%/4%.

| | |
|---|---|
| (1) Aluminum source powder<br>Aluminum oxide powder (α-alumina powder) having D50 of 29 μm | 47 parts by mass |
| (2) Titanium source powder:<br>Titanium oxide powder (rutile-form crystal) having D50 of 0.5 μm | 47 parts by mass |
| (3) Magnesium source powder:<br>Magnesium oxide powder having D50 of 2.5 μm | 2 parts by mass |
| (4) Silicon source powder:<br>Glass frit (Takara Standard's "CK0160M1", having $SiO_2$ content of 70%) having D50 of 5.4 μm | 4 parts by mass |

To the mixture of the above aluminum source powder, titanium source powder, magnesium source powder and silicon source powder, added were, relative to 100 parts by mass of the mixture, potato starch as a pore-forming agent in an amount of 14 parts by mass, methyl cellulose as a binder in an amount of 9 parts by mass, polyoxyalkylene alkyl ether as a surfactant in an amount of 5 parts by mass, and glycerin as a lubricant in an amount of 0.5 parts by mass, and further water as a dispersant in an amount of 32 parts by mass was added, and then kneaded with a kneader to prepare clay for shaping. Next, the clay for shaping was shaped by extrusion to produce a honeycomb-form shaped body. In an air atmosphere, the obtained shaped body was fired at 1500° C. for 5 hours to give a honeycomb-shaped aluminum titanate-based ceramics body.

The three-point bending strength of the obtained aluminum titanate-based ceramics body was 1.5 MPa, the AT conversion ratio thereof was 100%, the coefficient of thermal expansion thereof was $2\times10^{-6}$ $K^{-1}$, the opening porosity thereof was 45%, and the pore diameter thereof was 15 μm.

Example 1

The aluminum titanate-based ceramics body obtained in Comparative Example 1 was roughly ground using a roll crusher (roll-to-roll distance, 2 mm), and 500 g of the obtained ground material was put into an alumina-made grinding container [inner volume, 3.3 L] along with 5 kg of alumina balls [diameter, 15 mm]. Subsequently, the grinding container was vibrated for 6 minutes using a vibration mill under the condition of an amplitude of 5.4 mm, a vibration frequency of 1760 times/min, and a power of 5.4 kW, thereby pulverizing the roughly ground material in grinding container to give a pulverized material. The obtained, pulverized material was classified through a sieve having a sieve mesh size of 63 µm, and the powder having passed through the sieve was collected. The median particle diameter of the powder was 23 µm. The ratio of the particle diameter (D90) corresponding to a cumulative percentage of 90% on a volume basis to the particle diameter (D10) corresponding to a cumulative percentage of 10% on a volume basis, D90/D10 was 4.7.

Next, to 9 parts by mass of the above-mentioned, recovered powder, added were 42 parts by mass of the same aluminum oxide powder (1) as in Comparative Example 1, 42 parts by mass of the same titanium oxide powder (2) as in Comparative Example 1, 2 parts by mass of the same magnesium oxide powder (3) as in Comparative Example 1, and 4 parts by mass of the same glass frit (4) as in Comparative Example 1, and in addition, 14 parts by mass of potato starch as a pore-forming agent, 9 parts by mass of methyl cellulose as a binder, 5 parts by mass of polyoxyethylene alkyl ether as a surfactant, and 0.5 parts by mass of glycerin as a lubricant were added thereto, and further, 32 parts by mass of water as a dispersant was added thereto, and kneaded with a kneader to prepare a regenerated clay. Next, the regenerated clay was shaped by extrusion to produce a honeycomb-form shaped body. The obtained shaped body was fired in an air atmosphere at 1500° C. for 5 hours to give a honeycomb-shaped aluminum titanate-based ceramics body.

The three-point bending strength of the obtained aluminum titanate-based ceramics body was 1.8 MPa, the AT conversion ratio thereof was 100%, the coefficient of thermal expansion thereof was $1 \times 10^{-6}$ K$^{-1}$, the opening porosity thereof was 45%, and the pore diameter thereof was 16 µm. When the obtained aluminum titanate-based ceramics is represented by a compositional formula $Al_{2(1-x)}Mg_xTi_{(1+x)}O_5$, x was 0.12.

The mode and Examples for carrying out the invention disclosed at this time are exemplification in all aspects, and those should be considered unlimitedly. The scope of the invention is indicated not by the above-mentioned description but by the claims, and is intended to comprise all variations in the meaning and in the range of claims-equivalent.

INDUSTRIAL APPLICABILITY

The aluminum titanate-based ceramics body obtained by the invention has excellent mechanical strength and thermal characteristics and is therefore favorably applicable to exhaust gas filters such as DPF, and is also favorably applicable, for example, to filtration filters for edibles such as beer; selective permeation filters for selectively permeating vapor components formed in oil purification (for example, carbon monoxide, carbon dioxide, nitrogen, oxygen); tools for firing furnaces such as crucibles, setters, saggers, refractories; catalyst carriers; electronic parts such as substrates, capacitors and the like.

The invention claimed is:

1. A process for producing an aluminum titanate-based ceramics body using a fired ceramics body recovered in a production process for an aluminum titanate-based ceramics body, comprising the following steps:

(i) a step of preparing a pulverized product having a median particle diameter of 100 µm or less from the fired ceramics body;
(ii) a step of preparing a regenerated clay containing the pulverized product and water;
(iii) a step of shaping the regenerated clay to form a shaped body; and
(iv) a step of firing the shaped body,
wherein the particle diameter distribution of the pulverized product measured through laser diffractometry satisfies the following formula (1):

$$D90/D10 \leq 8 \qquad (1)$$

(wherein D90 is a particle diameter corresponding to a cumulative percentage of 90% on a volume basis, and D10 is a particle diameter corresponding to a cumulative percentage of 10% on a volume basis).

2. The process according to claim 1, wherein the fired ceramics body contains an aluminum titanate-based crystal structure.

3. The process according to claim 2, wherein the fired ceramics body further contains a magnesium element.

4. The process according to claim 2, wherein the fired ceramics body further contains a silicon element.

5. The process according to claim 1, wherein the step (i) of preparing a pulverized product having a median particle diameter of 100 µm or less includes a step of pulverizing and classifying the fired ceramics body.

6. The process according to claim 5, wherein the classification is carried out by sieving.

7. The process according to claim 1, wherein the median particle diameter of the pulverized product is from 10 to 50 µm.

8. The process according to claim 1, wherein the regenerated clay further contains one or more ingredients selected from a group of a binder, a lubricant and a pore-forming agent.

9. The process according to claim 1, wherein the regenerated clay further contains a new starting material comprising an aluminum titanate-based ceramics powder and/or a ceramics powder mixture to be led to an aluminum titanate-based ceramics by firing.

10. The process according to claim 9, wherein the aluminum titanate-based ceramics powder to constitute the new starting material further contains a magnesium element.

11. The process according to claim 9, wherein the aluminum titanate-based ceramics powder to constitute the new starting material further contains a silicon element.

12. The process according to claim 9, wherein the ceramics powder mixture to constitute the new starting material contains an aluminum source powder and a titanium source powder.

13. The process according to claim 12, wherein the ceramics powder mixture to constitute the new starting material further contains a magnesium source powder.

14. The process according to claim 12, wherein the ceramics powder mixture to constitute the new starting material further contains a silicon source powder.

15. The process according to claim 14, wherein the silicon source powder is a powder comprising feldspar, glass frit or a mixture thereof.

16. The process according to claim 10, wherein the median particle diameter of the aluminum titanate-based ceramics powder and/or the ceramics powder contained in the ceramics powder mixture, which constitute the new starting material, is 100 µm or less.

17. The process according to claim 1, wherein the firing temperature in the step (iv) of firing the shaped body is not lower than 1300° C. and lower than 1650° C.

18. An aluminum titanate-based ceramics honeycomb shaped body for porous ceramics filters, produced in the process according to claim 1.

19. A diesel particulate filter comprising the honeycomb shaped body according to claim 18.

* * * * *